United States Patent [19]

Williams

[11] 4,175,217
[45] Nov. 20, 1979

[54] TELEPHONE HEADSET

[76] Inventor: Lewis M. Williams, 1205 College Ave., Bronx, N.Y. 10456

[21] Appl. No.: 891,700

[22] Filed: Mar. 30, 1978

[51] Int. Cl.² .............................................. H04M 1/05
[52] U.S. Cl. ................................................ 179/156 R
[58] Field of Search ................ 179/156 A, 156 R, 103

[56] References Cited
U.S. PATENT DOCUMENTS

| | | | |
|---|---|---|---|
| 2,410,434 | 11/1946 | Edwards et al. | 179/103 |
| 3,426,160 | 2/1969 | Ring | 179/100 D |
| 3,555,207 | 1/1971 | Cech | 179/156 A |
| 4,048,453 | 9/1977 | Seidel | 179/156 R |

*Primary Examiner*—William C. Cooper
*Attorney, Agent, or Firm*—Hubbell, Cohen, Stiefel & Gross

[57] ABSTRACT

A telephone headset including a dialing mechanism for allowing a user to place and receive calls, without being disturbed by loud noises nearby, when the headset is connected to a telephone line. The headset also includes a signaling device for alerting the user to incoming calls when a switch on the headset is in one of two given states. A dial tone is obtained prior to making outgoing calls by placing the switch in its second state.

2 Claims, 3 Drawing Figures

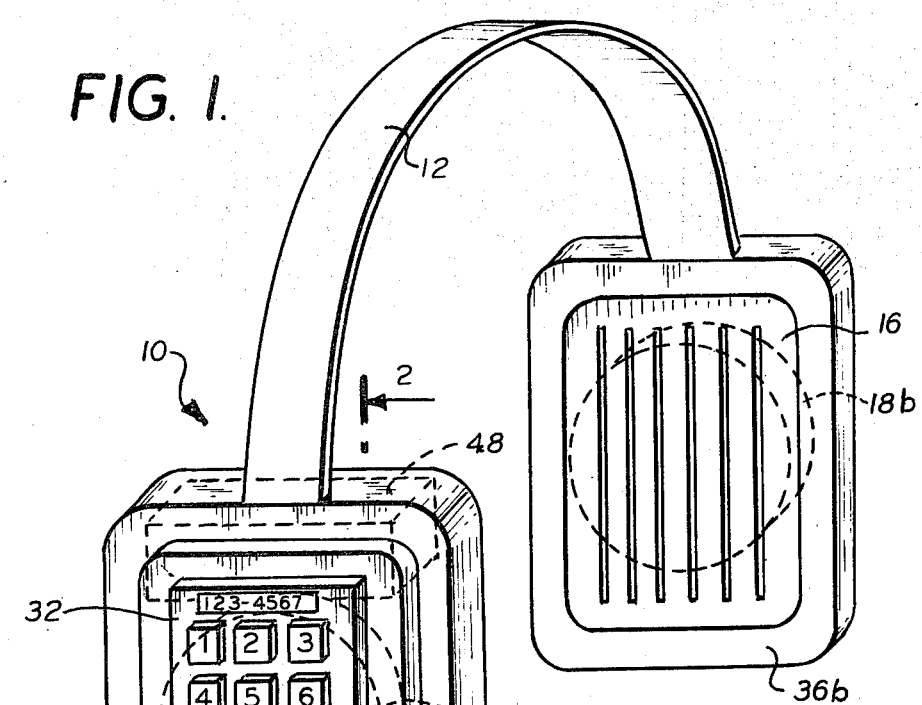
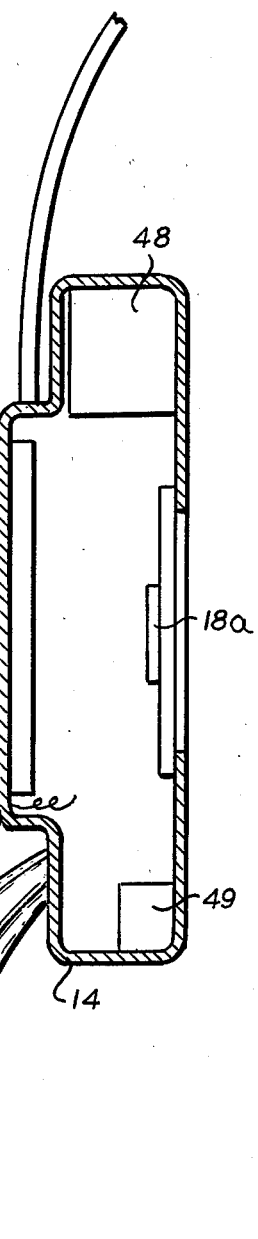
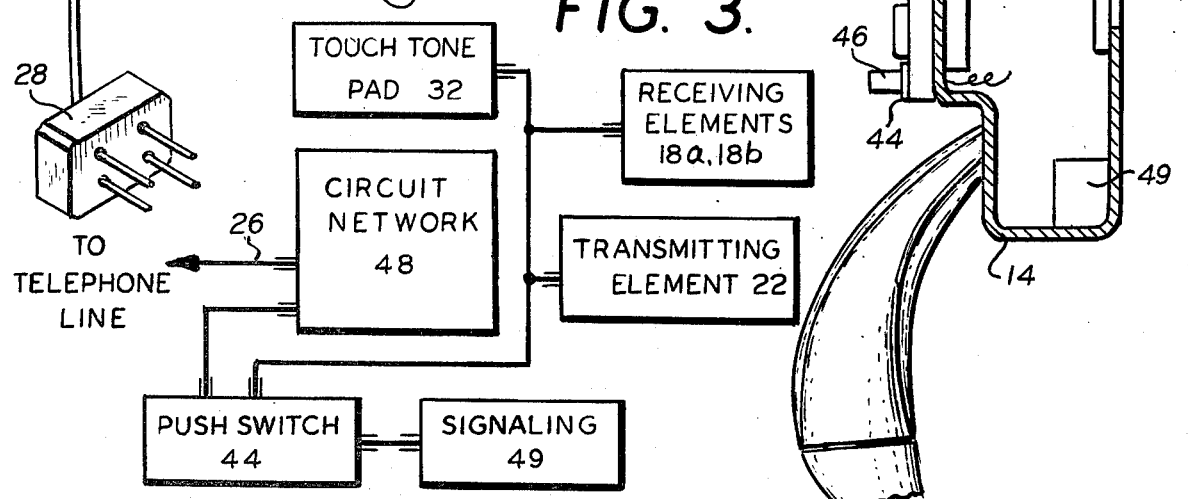

TELEPHONE HEADSET

BACKGROUND OF THE INVENTION

1. Field of the Invention

This invention relates to head worn devices for use in combination with a telephone system.

2. Description of the Prior Art

Devices are known for supporting a conventional telephone handle having voice receiving and transmitting elements therein, the telephone handle being maintained in normal relationship with the head of a user when the user places one of these supporting devices about this head. Examples of such prior art devices are disclosed in U.S. Pat. Nos. 2,598,928; and No. 2,653,193. Each of the aforesaid patented devices must be used in combination with a conventional telephone receiver or handset. Another device shown in U.S. Pat. No. 2,846,521 relates to a particular dual channel headset which must also be used in combination with a standard handset.

Thus, the prior telephone handset support devices do not themselves include means to allow a user to dial a call on a telephone system. A separate desk or wall telephone unit having dialing means thereon must be provided in addition to the support device. Such a requirement thereby severely limits the usefulness of these prior support devices, their being dependent upon conventional telephone equipment, already installed, in connection with their use.

The above and other shortcomings of the prior head worn telephone devices are overcome by the present invention.

SUMMARY OF THE INVENTION

The telephone headset of the present invention affords a user a completely self-contained telephone which can be used even in very noisy environments. Thus, in addition to voice transmitting and receiving elements mounted within housings on a headstrap, the present headset has dialing means for placing a call, for example, a Touch Tone pad also joined to the headstrap. The dialing means is preferably mounted through one of the housings joined to the headstrap in which a receiving element, or earpiece, is also disposed for positioning adjacent an ear of the user. Also contained in the headset of the present invention are circuit means for operatively coupling the dialing means and receiving and transmitting elements to a telephone line.

A two position switch in the present headset is provided for either allowing a signaling device in the headset to alert the user to incoming calls, or allowing the user to obtain a dial tone and to place outgoing calls by way of the dialing means, depending on the state of the switch.

Another housing containing a second earpiece can also be provided at the other end of the headstrap for directing sound produced by that earpiece towards the other ear of the user.

BRIEF DESCRIPTION OF THE DRAWINGS

FIG. 1 is a perspective view of an embodiment of a telephone headset according to the present invention;

FIG. 2 is a side view, partly in section and partly in elevation, taken along line 2—2 in FIG. 1; and FIG. 3 is a schematic block diagram of the present telephone headset.

DESCRIPTION OF THE INVENTION

Referring now to the drawing and initially to FIG. 1 thereof, a telephone headset 10 according to the present invention includes a headstrap 12 preferably arcuately formed from a suitable resilient material to accommodate the head of a user when placed downwardly thereover. While the headstrap 12 is disclosed herein as being made from a continuous piece of resilient material, it is understood that the headstrap 12 can be made from a number of separate elements joined together in suitable fashion to provide adjustability in length and contour thereof in order to more closely accommodate the user's head. At any rate, the headstrap 12 should preferably be made from a material that is lightweight, mechanically sturdy and resilient.

Also shown in FIG. 1 are housings or containers 14, 16, each of them being preferably joined to both ends of the headstrap 12, respectively. The housings 14 and 16 have receiving elements or earpieces 18a, 18b mounted therein, respectively. The earpieces 18a, 18b may be any conventional type of earphone or speaker that is compatible with telephone systems. Housings 14, 16 are preferably made of a sturdy lightweight material such as plastic, the selected material also preferably being lightweight.

An arm 20, shown in FIG. 1 as connected preferably at one end thereof to the lower portion of housing 14, supports a microphone 22 to be positioned near the headset user's mouth. The microphone 22 is preferably mounted within a housing 24 attached to the other end of the arm 20 and may be of any conventional construction usable in telephone systems. Arm 20 and housing 24 are also preferably made from lightweight sturdy plastic material. The arm 20 may itself comprise upper and lower portions 20a, 20b which are connected for pivotal movement relative to each other as at 25. This pivotal connection will allow the lower arm portion 20b to swing the microphone 22 to a desired position in the vicinity of the user's mouth when the lower arm portion 20b is rotated in either of arrow directions A and B.

A cable 26, shown in FIG. 1 as entering the headset 10 preferably through an opening 27 in the housing 14, acts to connect later described components within the headset 10 to a telephone line as by way of either a conventional telephone plug connector 28 at the outside end of the cable, or a switchboard type connector 30 which may take the place of the connector 28.

In accordance with the present invention is the provision of a dialing mechanism such as, for example, a conventional Touch Tone pad 32. Touch tone pad 32 is shown in FIGS. 1 and 2 as preferably mounted through a wall of housing 14 for ready access by the user as by holding the headset 10 in one hand while operating the keys 34 of the pad 32 with the other hand. Of course, pad 32 may instead be mounted through a wall of the opposite housing 16, if desired.

Each of the housings 14, 16 is shown in FIG. 1 as having cushions 36a, 36b, respectively, surrounding their peripheral edges. The surfaces of cushions 36a, 36b are adapted to confront the user's head about the ears, and provide a comfortable fit for the user while the housings 14, 16 are maintained in tight relationship against the user's ears by the headstrap 12. The cushions 36a, 36b are optional and have been omitted in FIG. 2, although their use with the headset 10 is preferred for the user's comfort.

FIG. 2 further illustrates the earpiece 18a, touch tone pad 32 with keys 34, and other components to be described later below.

Also provided through the outer wall of housing 14 is a switch 44 which is actuable, preferably by a button 46, but which may be actuable by other means, e.g., a toggle, as well. As will be explained, switch 44 is intended to function equivalently to the cradle actuated switch provided in a conventional telephone desk set, that switch acting to allow a user to place an outgoing call or converse with an incoming caller whenever the telephone handle is removed therefrom. Thus, switch 44 has two operative states which are preferably selectable by way of button 46. The button 46 assumes a depressed position corresponding to one switch state when it is pushed in a first time, and assumes a raised position corresponding to the other switch state after it is pushed in a second consecutive time. Switch 44 is connected to an electronic circuit network 48, which is shown, for illustrative purposes only, as extending across the upper portion of container 14 in FIGS. 1 and 2. The network 48 may, of course, be elsewhere conveniently located.

Electronic circuit network 48 operates to interface earpieces 18a, 18b, microphone 22, and touch tone pad 32 to the telephone line system when push button switch 44 is in its second state, i.e., button 46 is in a raised position. Thus, network 48 is similar in operation to one normally included in conventional telephone units, and may be fabricated by one skilled in the art for placement in headset 10.

A conventional signaling device 49 such as a buzzer is provided within the lower portion of housing 14, for example, for alerting the user to an incoming call when the button switch 44 is in its first state, i.e., button 46 is in a depressed position. A series of unshown wire leads interconnect the circuit network 48 by way of switch 44 with the various above described components of the headset 10, the leads being preferably routed within the housings 14, 16, headstrap 12 and arm 20. A schematic block diagram of the circuitry within headset 10, illustrating the aforesaid interconnections, is shown in FIG. 3.

Although not shown in the drawings, it is understood that the headset 10 of the present invention may further include means for illuminating the keyboard of the Touch Tone pad 32 when the switch 44 is in its second state. Further, if required, a battery may also be contained within either of the housings 14, 16 or even within the headstrap 12 should a voltage source be required for operation of the Touch Tone pad 32, electronic circuit network 48 or the illumination means just described.

Operation of the headset 10 of the present invention is easily carried out by first plugging the headset 10 into a telephone line system by way of the conventional plug connector 28 or switchboard connector 30, whichever connector happens to be provided with the headset 10. Of course, headset 10 may also be permanently connected, i.e., "hard wired" to a telephone line if desired, although some form of connector for the cable 26 is preferred should portability be an important consideration. If an outgoing call is to be made, button 46 of switch 44 is brought to a raised position to thereby connect touch tone pad 32, earpieces 18a, 18b and microphone 22 for operation on the telephone line by way of circuit network 48.

A call is then placed by the user by selectively depressing keys 34 on the pad 32. The user then places the headset 10 about his head, moving housings 14, 16 comfortably over his ears and swinging arm 20 in position below his mouth. The user is then free to use both of his hands while, at the same time, conversing with the party who he has just called without disruption by loud noises which may be experienced in the vicinity of the user. Further, cable 26 may be of a considerable length to allow the user to walk about a room, for example, without causing the connector 28 or 30 to be inadvertently pulled out from its mating socket.

After the call has been completed, the user merely depresses button 46 on switch 44 once again to bring switch 44 into its second state, wherein the circuit network 48 couples the buzzer 49 to the telephone line so as to alert the user to an incoming call. The headset 10 may then be placed down on a table or shelf for later use while the connector 28 or 30 remains connected to the telephone line.

Variations and modifications of the present invention will be readily obvious to a worker skilled in the art upon reading the above description thereof with reference to the accompanying drawings. It is therefore intended that all such variations and modifications including those expressly stated above, and others, be included within the spirit and scope of the present invention as defined in the appended claims.

What is claimed as new and desired to be secured by Letters Patent is:

1. A telephone headset for connection to a telephone line, said headset having a pair of earphones and a microphone contained therein, said headset comprising:
   a headstrap formed to span the head of a user;
   first and second housings connected to said headstrap for placement adjacent the two ears of said user, said earphones being mounted in said housings for directing sound towards the user's ears;
   a telephone dialing mechanism disposed one one of said housings on the surface thereof disposably remote from the user's ear;
   an arm comprising two pivotally connected portions, one end of said arm being connected to the lower portion of either one of said housings and the other end of said arm being connected to said microphone for positioning said microphone in the vicinity of the user's mouth;
   signaling means disposed in said headset for alerting the user to an incoming call when said headset is operatively connected to said telephone line;
   circuit network means disposed in said headset for coupling said earphone, said microphone, said dialing mechanism, and said signaling means to said telephone line; and
   switch means connected to said circuit network means for selecting either a first operating state for said headset wherein said signaling means is connected to said telephone line for alerting the user to an incoming call, or a second operating state wherein said microphone, said earphones and said dialing mechanism are connected to said telephone line for enabling said user to place an outgoing call and converse using said headset.

2. A headset according to claim 1, wherein said headstrap comprises a resilient, arcuately formed material.

* * * * *